Dec. 15, 1964    R. A. SARTOR    3,161,296
VEHICLE PIPE RACK
Filed March 15, 1963
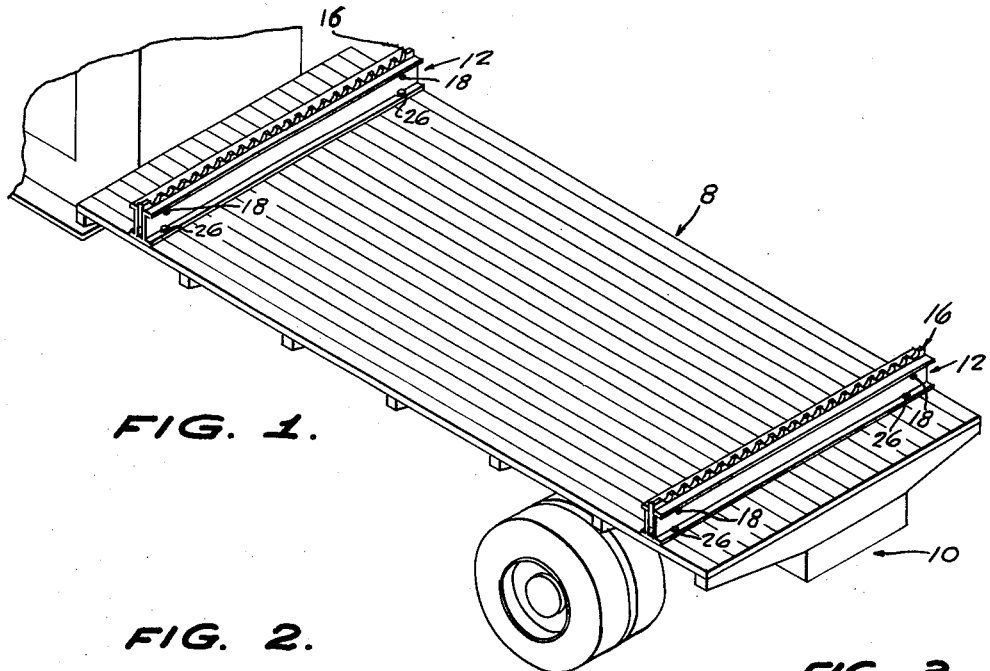
FIG. 1.
FIG. 2.     FIG. 3.
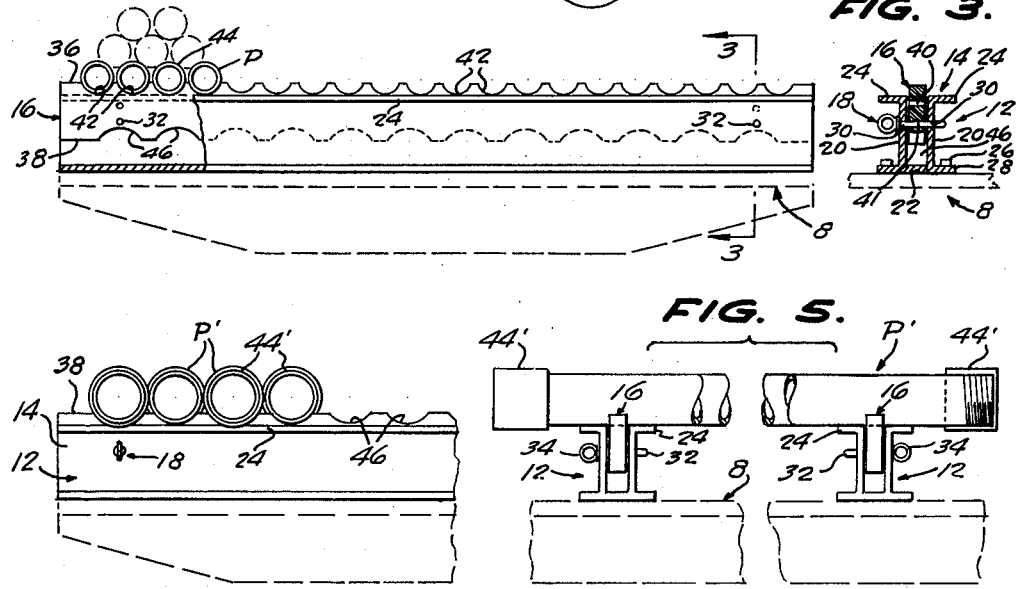
FIG. 4.     FIG. 5.
INVENTOR.
RAYMOND A. SARTOR,
BY
McMorrow, Berman & Davidson
ATTORNEYS.

3,161,296
VEHICLE PIPE RACK
Raymond A. Sarter, 23 MacAlester Road, Pueblo, Colo.
Filed Mar. 15, 1963, Ser. No. 265,484
6 Claims. (Cl. 211—60)

This invention relates to an improved rack for the transportation of pipe, as on the beds of trailers or other vehicles.

The primary object of the invention is the provision of a safer, more practical, and more efficient rack of the kind indicated, which facilitates loading and unloading of pipe, prevents lateral shifting and chafing of pipe, in transit on rough roads, and which does not require capping or uncapping of pipes before laying them in the rack.

Another object of the invention is the provision of a rack of the character indicated above which has anchored reversible bars which have pipe-receiving notches of different diameters and spacings, on their opposed edges, whereby pipe of different diameters can be equally accommodated on the rack.

A further object of the invention is the provision of a simple rack of the character indicated above, which is composed of a minimal number of uncomplex and easily assembled parts, and which installs and removes easily from a vehicle bed.

Other important objects and advantageous features of the invention will be apparent from the following description and the accompanying drawings, wherein, for purposes of illustration only, a specific form of the invention is set forth in detail.

In the drawings:

FIGURE 1 is a schematic perspective view, showing a rack of the present invention installed on the bed of a trailer;

FIGURE 2 is an enlarged end elevation of FIGURE 1, partly broken away and in section, showing pipes in place on the rack;

FIG. 3 is a vertical section taken on the line 3—3 of FIGURE 2;

FIGURE 4 is an enlarged fragmentary view like FIGURE 2, showing pipes in the notches of the bars of the rack, the caps or couplings on the adjacent pipes being reversed at the ends of the pipes; and FIGURE 5 is a contracted side elevation of the rack, showing pipes in place thereon.

Referring in detail to the drawings, wherein like numerals designate like parts throughout the several views, the illustrated rack comprises a horizontal support, such as the bed 8 of a trailer 10 or other vehicle, and two longitudinally spaced similar brackets 12 extending across and mounted upon the bed 8.

Each of the brackets 12, which can be in reversed relationship, for ease and convenience in placing and removing their retaining pins, comprises a channel holder 14, and a notched bar 16 engaged in the holder, and retained therein by retaining pins 18.

The holder 14 comprises parallel spaced side walls 20 upstanding from a base plate 22, which is wider than and extends laterally beyond each of the side walls. The side walls 20 have oppositely extending coextensive lateral flanges 24, along their upper edges, upon which pipes rest. The holder is fixed upon the bed 10, as by means of bolts or rivets 26 extending through the lateral projecting portions 28 of the base plate 22, and the bed, at ends of the former. The side walls 20 are formed, adjacent to their ends, with aligned holes 30, through which the retaining pins 18 engage.

The pins 18 comprise smooth shanks 32, adapted, as shown in FIGURE 3, to extend through the holes 30 and one of the side walls 20, and enlarged diameter eyes 34, on one end of the shanks, adapted to bear against the outer side of one of the side walls.

The notched bar 16 is as long as the holder 14, is horizontally disposed between the holder side walls 20, in a vertical plane, and is thick enough to be a relatively close fit within the holder. The vertical dimension of the support bar 16 is less than the height of the holder side walls 20, as shown in FIGURES 2, 3 and 5, and is formed, intermediate its opposed first and second edges 36 and 38, respectively, with pairs of vertically spaced transverse bores 40 and 41, respectively, located adjacent to the ends of the bar, through which the retaining pins 18 are selectively passed, whereby the bar is supported with its lower edge spaced above the base plate 22, and its upper edge is spaced above the side wall flanges 24.

The first edge 36 of the support bar 16 is formed, at equally spaced intervals therealong, with relatively small arcuate pipe receiving notches 42, which are dimensioned to receive preferably the lower thirds of relatively small pipes P, in uniformly laterally spaced relationship to each other, as shown in FIGURE 2. The notches 42 are dimensioned and spaced so that there is no abrasive contact between that sidewalls of the pipes P, and so that sufficiently wide gaps are provided between adjacent pipes of the lower tier that additional pipes P laid upon the lower tier of pipes are amply supported against lateral shifting out of place. Further, the spacings of the lower tier of pipes P is such that any caps or couplings 44 present on these pipes need not be removed, or supplied if not present, since these, usually only on one end of the pipes, can be staggered endwise and be accommodated in the spaces provided between the sidewalls of the pipes P.

The second edge 38 of the bar 16 is similarly formed with relatively large arcuate notches 46, for the inception of relatively large diameter pipe P', with their couplings or caps 44'' in reversed relationship, as shown in FIGURE 4.

To reverse the bar 16 in the holder 14, for the accommodation of related sizes of pipe P, P'. The pins 18 are parallel from the holder and from the related bores 40 and 41. The bar 16 removed from the holder, restored therein, in the new position, and the pins 18 put back in place in the other ones of these bores. As will be understood, chains or other holding means (not shown) will normally be provided to extend across the top tier of pipes for holding the load down in place on the rack.

Although there has been shown and described a preferred form of the invention, it is to be understood that the invention is not necessary confined thereto, and that any change or changes in the structure of and in the relative arrangements of components thereof are contemplated as being within the scope of the invention as defined by the claims appended hereto.

What is claimed is:

1. A vehicle pipe rack comprising a horizontal support, a pair of parallel transverse longitudinally spaced racks upstanding on and fixed to the support, said racks having pipe receiving notches spaced therealong in which pipes are adapted to rest with their sidewalls in laterally spaced relationship, said racks comprising upwardly opening channel holders secured upon the support, notched bars engaged in and extending upwardly out of the holders, the upper edges of the notched bars being formed with the bottoms of said notches on a level with the tops of the holders.

2. A vehicle pipe rack comprising a horizontal support, a pair of parallel transverse longitudinally spaced racks upstanding on and fixed to the support, said racks having pipe receiving notches spaced therealong in which pipes are adapted to rest with their sidewalls in laterally spaced relationship, said racks comprising upwardly opening channel holders secured upon the support, notched bars engaged in and extending upwardly out of the holders, the upper edges of the notched bars being formed with the bottoms of said notches on a level with the tops of the holders, said bars being formed with pairs of vertically spaced horizontal bores extending therethrough, said holders having side walls formed with single holes, and removable retaining pins extending through the holes and related bores of the bars.

3. A vehicle pipe rack comprising a horizontal support, a pair of parallel transverse longitudinally spaced racks upstanding on and fixed to the support, said racks having pipe receiving notches spaced therealong in which pipes are adapted to rest with their sidewalls in laterally spaced relationship, said racks comprising upwardly opening channel holders secured upon the support, notched bars engaged in an extending upwardly out of the holders, the upper edges of the notched bars being formed with the bottoms of said notches on a level with the tops of the holders, said bars being formed with pair of vertically spaced horizontal bores extending therethrough, said holders having side walls formed with single holes, and removable retaining pins extending through the holes and related bores of the bars, said bars being supported on the retaining pins having their lower edges spaced upwardly from the bottoms of the holders.

4. A vehicle pipe rack comprising a horizontal support, a pair of parallel transverse longitudinally spaced racks upstanding on and fixed to the support, said racks having pipe receiving notches spaced therealong in which pipes are adapted to rest with their sidewalls in laterally spaced relationship, said racks comprising upwardly opening channel holders secured upon the support, notched bars engaged in and extending upwardly out of the holders, the upper edges of the notched bars being formed with the bottoms of said notches on a level with the tops of the holders, said bars being formed with pairs of vertically spaced horizontal bores extending therethrough, said holders having side walls formed with single holes, and removable retaining pins extending through the holes and related bores of the bars, said holders comprising base plates from which said side walls rise, said base plate having portions reaching laterally outwardly from the side walls, and fastening means extending through said base plate portions into the support.

5. A vehicle pipe rack comprising a vehicle bed, a pair of longitudinally spaced racks fixed upon and extending across the bed, said racks comprising upwardly opening channel holders having upper edges having lateral flanges thereon, notched bars engaged in the holders, said bars having opposed first and second edges formed with longitudinally spaced arcuate notches of differing dimensions, said bars being reversible in the holders to present either said first or second edges upwardly, and means removably securing the bars in place in the holders with the bottoms of the upwardly-directed notches on a level with said lateral flanges.

6. A vehicle pipe rack comprising a vehicle bed, a pair of longitudinally spaced racks fixed upon and extending across the bed, said rack comprising upwardly opening channel holders having upper edges having lateral flanges thereon, notched bars engaged in the holders, said bars having opposed first and second edges formed with longitudinally spaced arcuate notches of differing dimensions, said bars being reversible in the holders to present either and first or second edges upwardly, and means removably securing the bars in place in the holders with the bottoms of the upwardly-directed notches on a level with said lateral flanges, said means comprising retaining pins removably traversing the holder side walls and the bars.

References Cited in the file of this patent

UNITED STATES PATENTS

| | | |
|---|---|---|
| 884,661 | Howe | Apr. 14, 1908 |
| 949,576 | Hunter | Feb. 15, 1910 |
| 991,736 | Minnick | May 9, 1911 |
| 1,729,181 | Neilson | Sept. 24, 1929 |
| 2,766,660 | Laddon | Oct. 16, 1956 |
| 2,896,887 | Beltz | July 28, 1959 |